US008678312B2

(12) United States Patent
Headrick et al.

(10) Patent No.: US 8,678,312 B2
(45) Date of Patent: Mar. 25, 2014

(54) AIRCRAFT SIDE-LEDGE CONSOLE

(75) Inventors: Jonathan Headrick, Wichita, KS (US); Todd Thisius, Cheney, KS (US); Dave Kuhn, Wichita, KS (US); Craig Cillessen, Wichita, KS (US); Dave Davis, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 160 days.

(21) Appl. No.: 13/222,930

(22) Filed: Aug. 31, 2011

(65) Prior Publication Data

US 2013/0048784 A1 Feb. 28, 2013

Related U.S. Application Data

(63) Continuation-in-part of application No. 29/400,571, filed on Aug. 30, 2011, now Pat. No. Des. 677,212, and a continuation-in-part of application No. 29/400,572, filed on Aug. 30, 2011, and a continuation-in-part of application No. 29/400,579, filed on Aug. 30, 2011, now Pat. No. Des. 677,213, and a continuation-in-part of application No. 29/400,582, filed on Aug. 30, 2011.

(51) Int. Cl.
*B64D 13/00* (2006.01)

(52) U.S. Cl.
USPC .................................................... 244/118.6

(58) Field of Classification Search
USPC .................. 244/118.6, 118.5; 248/311.2, 315
See application file for complete search history.

(56) References Cited

U.S. PATENT DOCUMENTS

| D295,969 | S | 5/1988 | Hooks et al. | |
|---|---|---|---|---|
| D314,739 | S | 2/1991 | Mallone | |
| D320,587 | S | 10/1991 | Kapp et al. | |
| 5,601,269 | A * | 2/1997 | Jankovic | 248/311.2 |
| 5,749,554 | A * | 5/1998 | Avila et al. | 248/311.2 |
| 5,876,007 | A * | 3/1999 | Lancaster et al. | 248/311.2 |
| 5,997,082 | A * | 12/1999 | Vincent et al. | 297/188.19 |
| D425,475 | S | 5/2000 | Herer | |
| 6,076,793 | A * | 6/2000 | Yamamoto | 248/311.2 |
| 6,264,273 | B1 | 7/2001 | Waters, Sr. | |
| D451,928 | S | 12/2001 | Van Huong | |
| 7,108,226 | B2 * | 9/2006 | Quan et al. | 244/118.6 |
| D553,554 | S | 10/2007 | Figueiredo | |
| D556,107 | S | 11/2007 | Figueiredo | |
| 7,311,354 | B2 | 12/2007 | Giasson | |
| D576,820 | S | 9/2008 | Priestman | |
| D576,821 | S | 9/2008 | Fissette et al. | |

(Continued)

OTHER PUBLICATIONS

Select File History from related U.S. Appl. No. 29/400,571, dated Oct. 12, 2012 through Jan. 13, 2013, 16 pages.

(Continued)

*Primary Examiner* — Tien Dinh
*Assistant Examiner* — Keith L Dixon
(74) *Attorney, Agent, or Firm* — Lathrop & Gage LLP

(57) ABSTRACT

A console for aircraft that is located between two seats which face each other. The console includes an open ledge with a cup holder arrangement. The cup holder arrangement includes two removable holder dividers which can be flipped up or down and held into position by a spring-loaded cam arrangement. The console also includes two inwardly facing surfaces which provide connectors for electronic devices resting on the ledge. A light-emitting face is provided on a back wall of the ledge so that any articles resting on the ledge can be seen in dark environments.

5 Claims, 10 Drawing Sheets

(56) References Cited

U.S. PATENT DOCUMENTS

| | | | |
|---|---|---|---|
| D577,501 S | 9/2008 | Fissette et al. | |
| D577,502 S | 9/2008 | Fissette et al. | |
| D577,503 S | 9/2008 | Priestman | |
| D589,870 S | 4/2009 | Saint-Jalmes et al. | |
| D591,665 S | 5/2009 | Saint-Jalmes et al. | |
| D592,126 S | 5/2009 | da Silveira et al. | |
| 7,578,470 B2* | 8/2009 | Plant | 244/118.6 |
| D608,366 S | 1/2010 | Matas | |
| 7,665,693 B2* | 2/2010 | Bettell | 244/122 R |
| D626,903 S | 11/2010 | Vermeersch et al. | |
| D630,159 S | 1/2011 | Saint-Jalmes et al. | |
| D634,698 S | 3/2011 | Saint-Jalmes et al. | |
| 7,963,231 B2* | 6/2011 | Osborne et al. | 108/40 |
| 7,966,952 B2 | 6/2011 | Fissette et al. | |
| 2006/0266779 A1 | 11/2006 | Mozer et al. | |
| 2009/0078169 A1 | 3/2009 | Osborne et al. | |
| 2009/0107366 A1 | 4/2009 | Fissette et al. | |
| 2009/0146004 A1 | 6/2009 | Plant | |
| 2009/0146005 A1 | 6/2009 | Bettell | |
| 2009/0284476 A1 | 11/2009 | Bull et al. | |
| 2010/0224727 A1* | 9/2010 | Bauer et al. | 244/118.5 |
| 2010/0293462 A1 | 11/2010 | Bull et al. | |

OTHER PUBLICATIONS

Select File History from related U.S. Appl. No. 29/400,572, dated Nov. 2, 2012, 6 pages.
Select File History from related U.S. Appl. No. 29/400,579, dated Oct. 12, 2012 through Jan. 14, 2013, 16 pages.
Select File History from related U.S. Appl. No. 29/400,582, dated Oct. 9, 2012 through Jan. 18, 2013, 20 pages.
International Search Report and written report in related PCT Serial No. PCT/US2012/053424 dated Feb. 27, 2013, 8 pages.

* cited by examiner

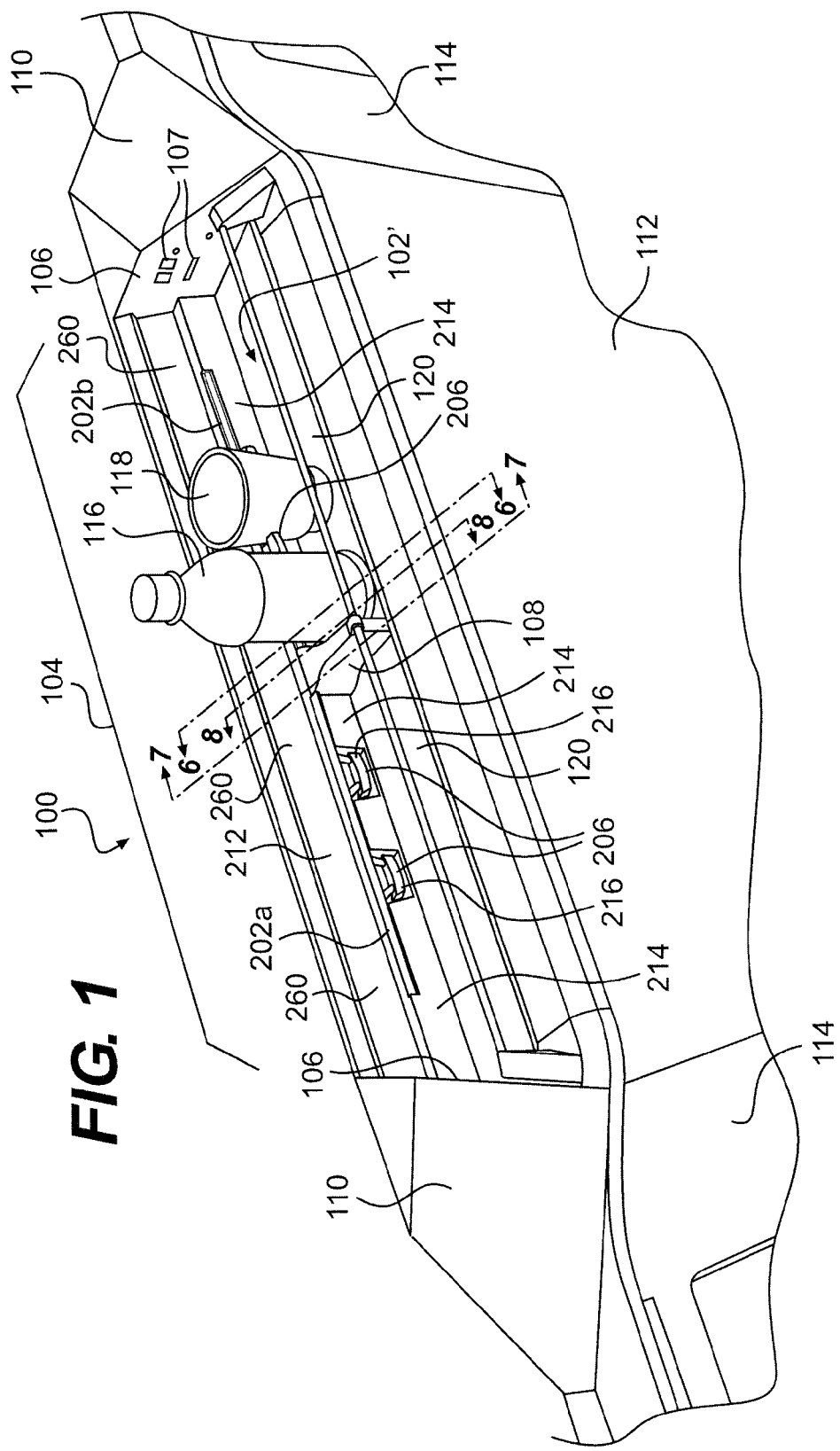

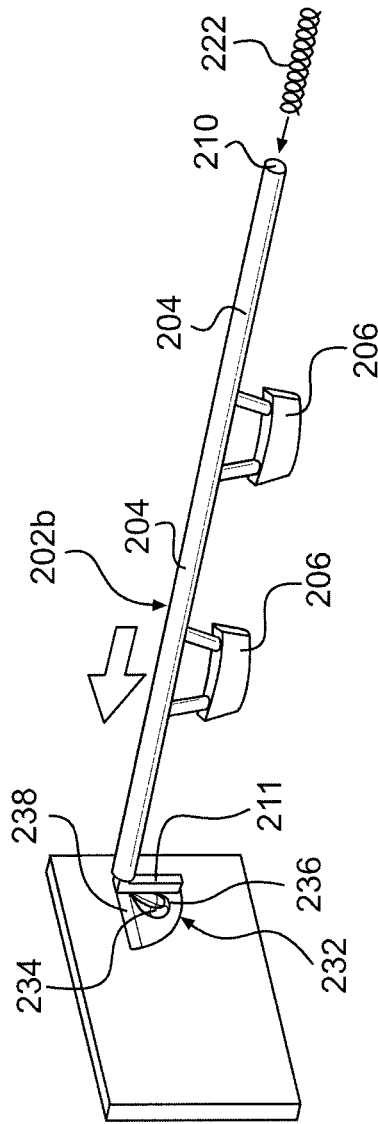
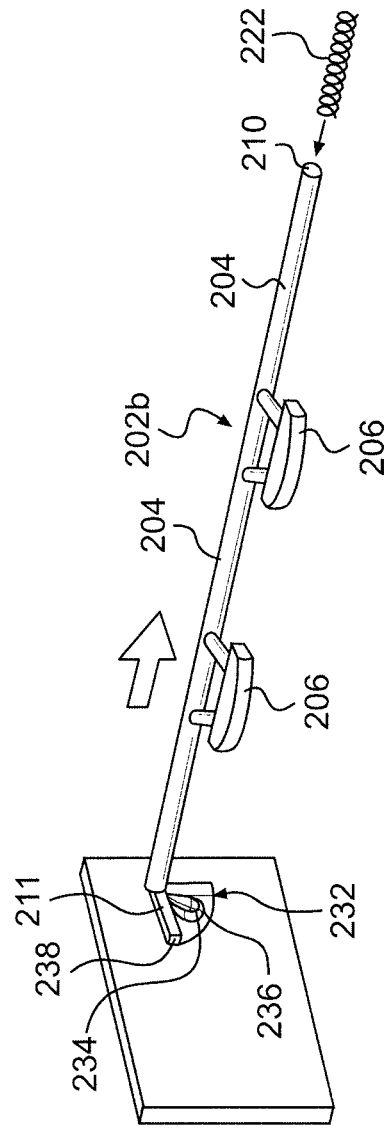

AIRCRAFT SIDE-LEDGE CONSOLE

CROSS-REFERENCE TO RELATED APPLICATIONS

This application is a continuation-in-part and claims the benefit of U.S. Design Pat. application Nos. 29/400,571, filed Aug. 30, 2011; 29/400,572, filed Aug. 30, 2011; 29/400,579, filed Aug. 30, 2011 and 29/400,582, filed Aug. 30, 2011 and the disclosures of each are herein incorporated by reference.

BACKGROUND OF THE INVENTION

1. Field of the Invention

The invention relates generally to the field of vehicle interiors. More specifically, the invention relates to the field of console arrangements located proximate passenger seating in aircraft.

2. Description of the Related Art

It is known to provide consoles in aircraft for the purpose of allowing passengers the ability to rest cups and other articles at seating areas in the aircraft. Historically, regardless of seat orientation, flip out tables have been provided adjacent to, or on the back of the next seat in sequence for the purpose of enabling passengers to support cups of other articles.

In seating arrangements where two seats face one another, consoles have been provided which are shared by the two opposing passengers. These arrangements normally have receptacles formed into the console for cups, bottles, or the like. See, e.g., U.S. Patent Application Publication No. 2009/0078169 made by Osborne et al. Also known, is to provide a flip-out table which is shared by the opposing passengers and can be used to support a variety of articles, e.g., food, reading materials, lap-top computers, etc. See, e.g., Osborne; see also U.S. Pat. No. 7,966,952 issued to Fissette et al.

SUMMARY

A console for aircraft is disclosed. In one embodiment, the console includes an open faced ledge. The ledge has a back wall, a platform, and opposing sidewalls. The platform is adapted to support personal items, e.g., cups, electronics, and other personal items. In embodiments, a portion of the back wall is illuminated so that articles can be seen. In still further embodiments, at least one of the opposing sidewalls including an electronics-device connector. Depending on the embodiment, the connector may be a USB port, an audio jack, or an electronics interface. Sometimes both sidewalls will have connectors.

A cup-holder arrangement on the console includes elongated bars on each side of an outcropped central divider. Each bar has an extending tang on one end, and a second end that is simply truncated. The bars also have flip-out retaining heads. The retaining heads are used to laterally secure containers received between the back wall and a front rail on the platform. The tangs are receivable and rotatably securable through a slots in the central divider. The other end of each bar is spring loaded so that the tangs bear against reciprocating cam surfaces existing in the central divider. Each cam has a transition ridge which, when reached by its reciprocating tang, compels the tang into a first radial position in which the retaining heads on that bar are in an extended position, or a second radial position where the retaining heads on that bar are in a retracted position. The second ends of each bar are subjected to a resilient force by inserting them into spring-loaded corridors located laterally outward from the central divider.

In embodiments, the back wall panel is a light guide, and a plurality of LEDs are located along a light-receiving edge of the light back wall panel. The light guide may be backed with a reflective surface so that the LEDs emit against the reflective surface to indirectly supply light to the light guide.

In another embodiment, the side-ledge console is the sort located between two opposing seats in an aircraft. This console includes outwardly facing video monitors, where each monitor faces one of the seats. The console also can an illuminated ledge area for holding articles; a flip-out cup-securing member, and two inside opposing faces which include electronic connectors.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 1 is a perspective view of the side-ledge console;

FIGS. 2A and 2B are views of the two alternative positions or modes for the cup-holder members used on the side-ledge;

DETAILED DESCRIPTION

Figure 10:
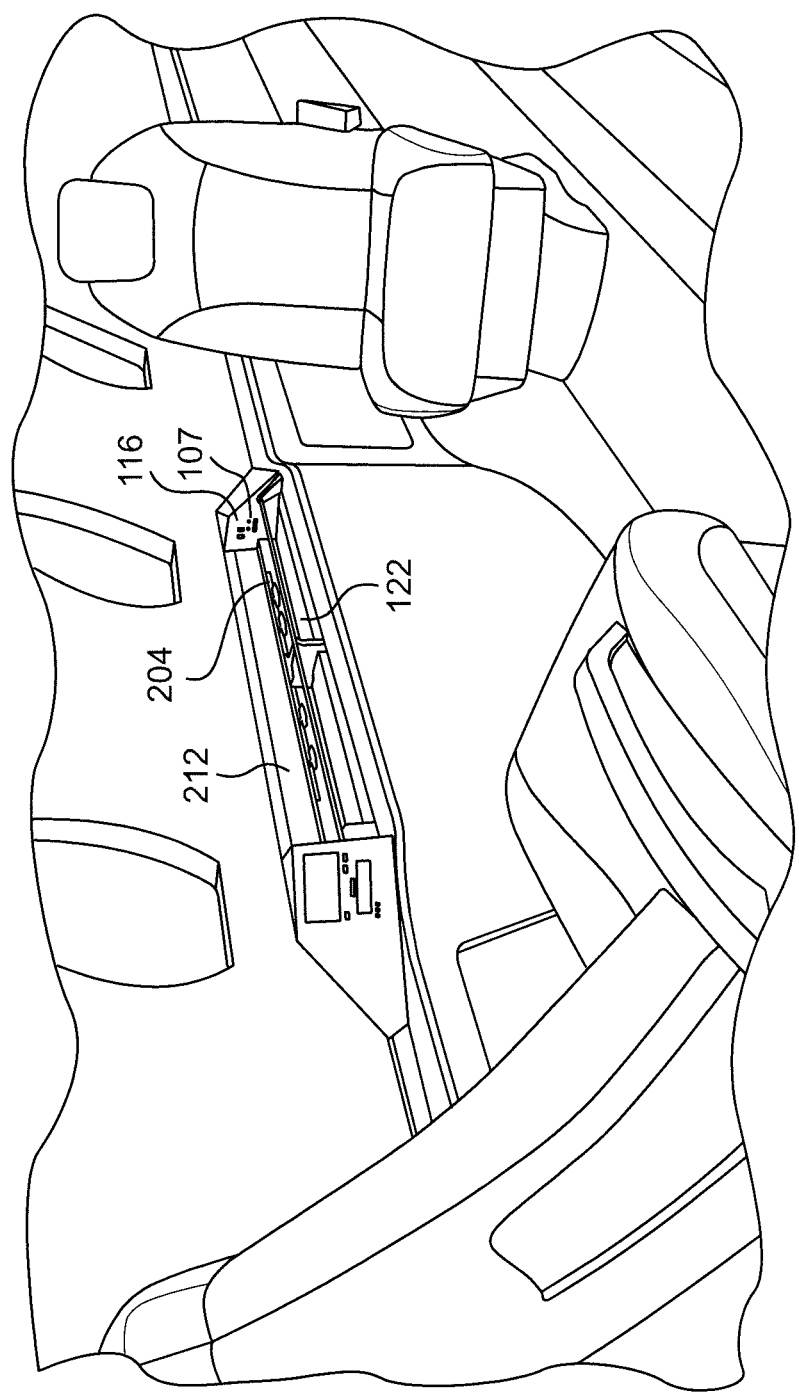
FIG. 10 shows the console in its environment between two seats that face one another.

Embodiments of the present invention include a console for aircraft which, in the disclosed embodiments, is designed to be located between two seats which face one another. See FIG. 10. The console, in embodiments, includes an open ledge which is illuminated. Also included is a cup holder arrangement that includes flip-up dividers. The arrangement enables the dividers to either be in a retracted mode or an extended mode using a spring loaded cam system.

The details of the disclosed console can be seen in FIGS. 1-10. Referring first to FIG. 1, it can be seen that console 100 comprises an open faced ledge 102, a center area 104, and opposing angled side walls 106. The opposing side walls 106 may include any combination and multiples of electronics coupling devices. For example, USB ports, audio/visual jacks, and electronics interfaces, collectively electronics 107. In the depicted embodiment, referring to FIG. 3, 2 USB ports 107*a*, a stereo input jack 107*b*, a stereo headphone jack 107*c*, and a 30-pin interface 107*d* (a/k/a, an iPod™/iPhone™ interface connector) are all included.

It can be seen from FIG. 1 that console 100 includes an outcropped central divider 108. On the outside of console 100, outwardly facing monitor faces 110 are placed so that viewers sitting in surrounding seats (which are not shown, but face one another on opposite sides of the console) are able to see the image and/or video being displayed. Below the open-faced ledge 102, an extendable flip-out table 112 exists. Those skilled in the art will recognize this sort of flip-out table is a known feature, and already exists on various consoles. Extending outward laterally, the console is blended into its surroundings using a blend-in paneling 114 on each side. In the depicted embodiment, the console is shown holding a bottle 116 and a cup 118 on the open-faced ledge 102. A platform 120 on the ledge is what supports the bottle 116 and cup 118. In addition to supporting bottles and cups, platform 120 can support other articles, and in the preferred embodiment, the supporting surfaces include a rubberized mat 122 which prevents sliding.

Referring now to FIGS. 2A and 2B, a cup holder arrangement 200 is shown. Cup holder arrangement 200 includes to flip-out cup holder members, 202a and 202b, which are each comprised of bar portions 204, and two retaining heads 206. At a first end 208 of each of bars 204, there is an outstanding tang/protrusion 211. At an opposite second rod end 210, there is no tang. Instead, the second end 210 of each bar 204 is truncated.

Figure 3:
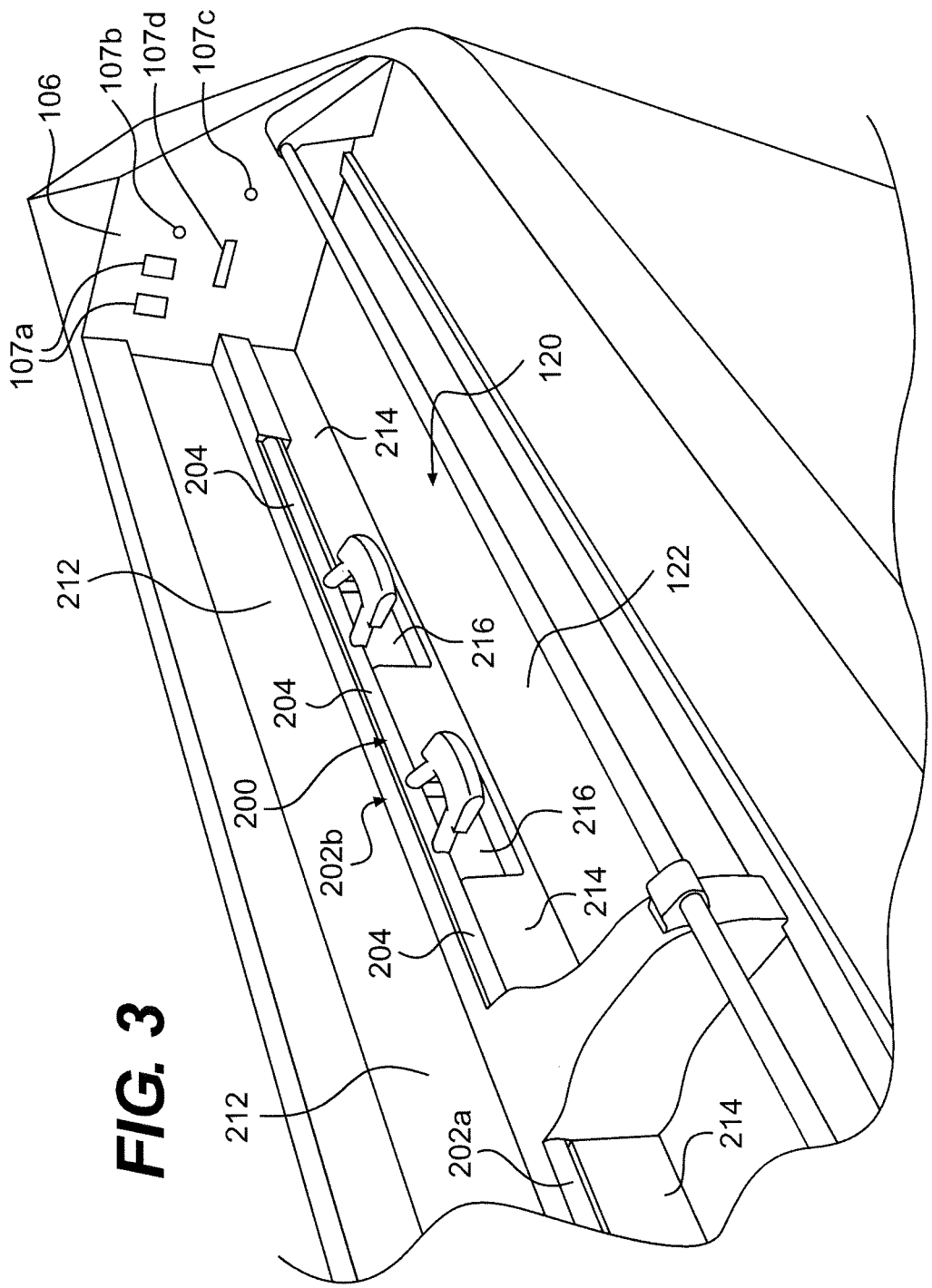
FIG. 3 is a view of the right hand side of the console showing the electronic connectors on that side.
Figure 4:
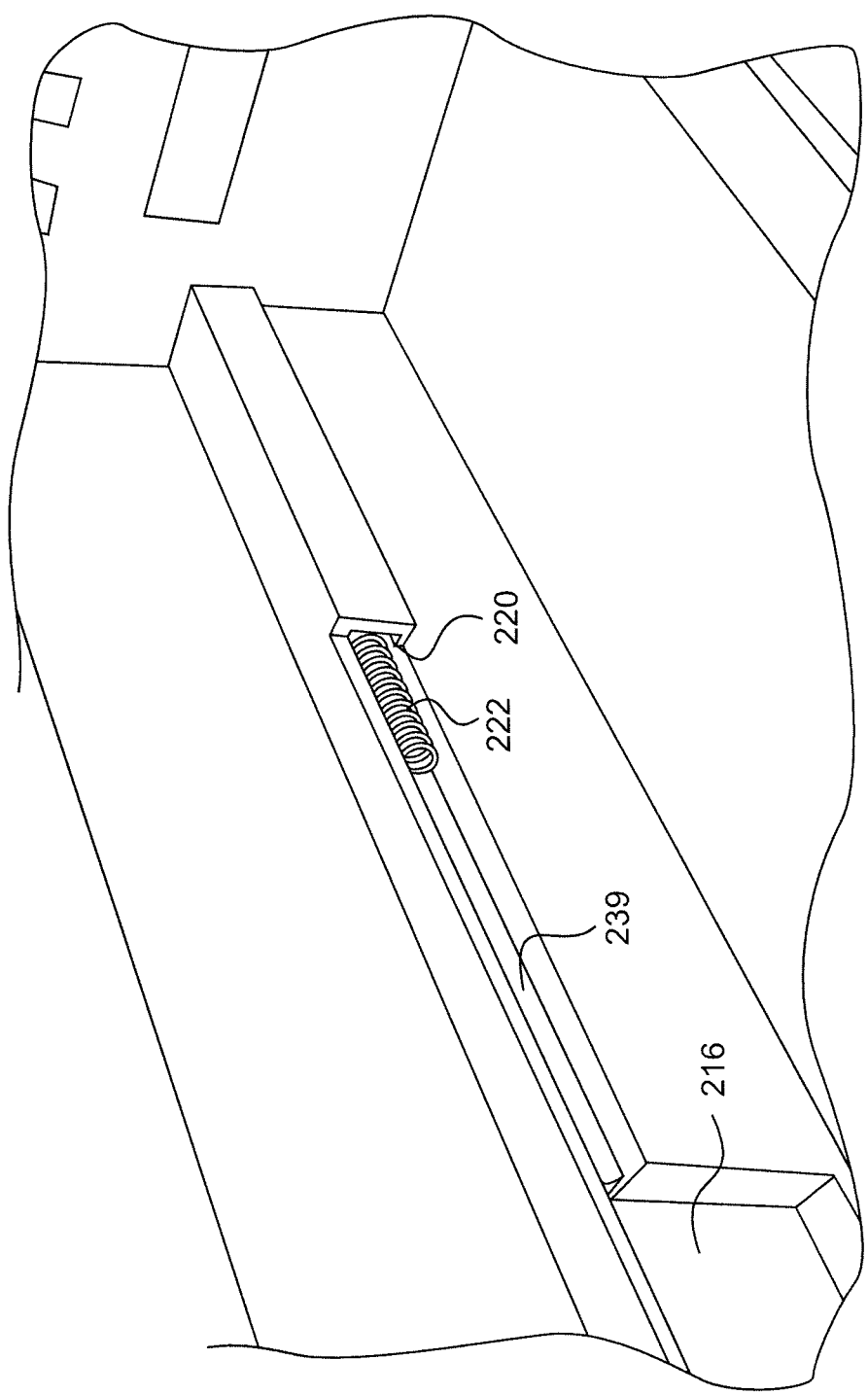
FIG. 4 shows the spring-loaded receptacle and rod-receiving channel features with the cup-holder member removed.
Figure 5:
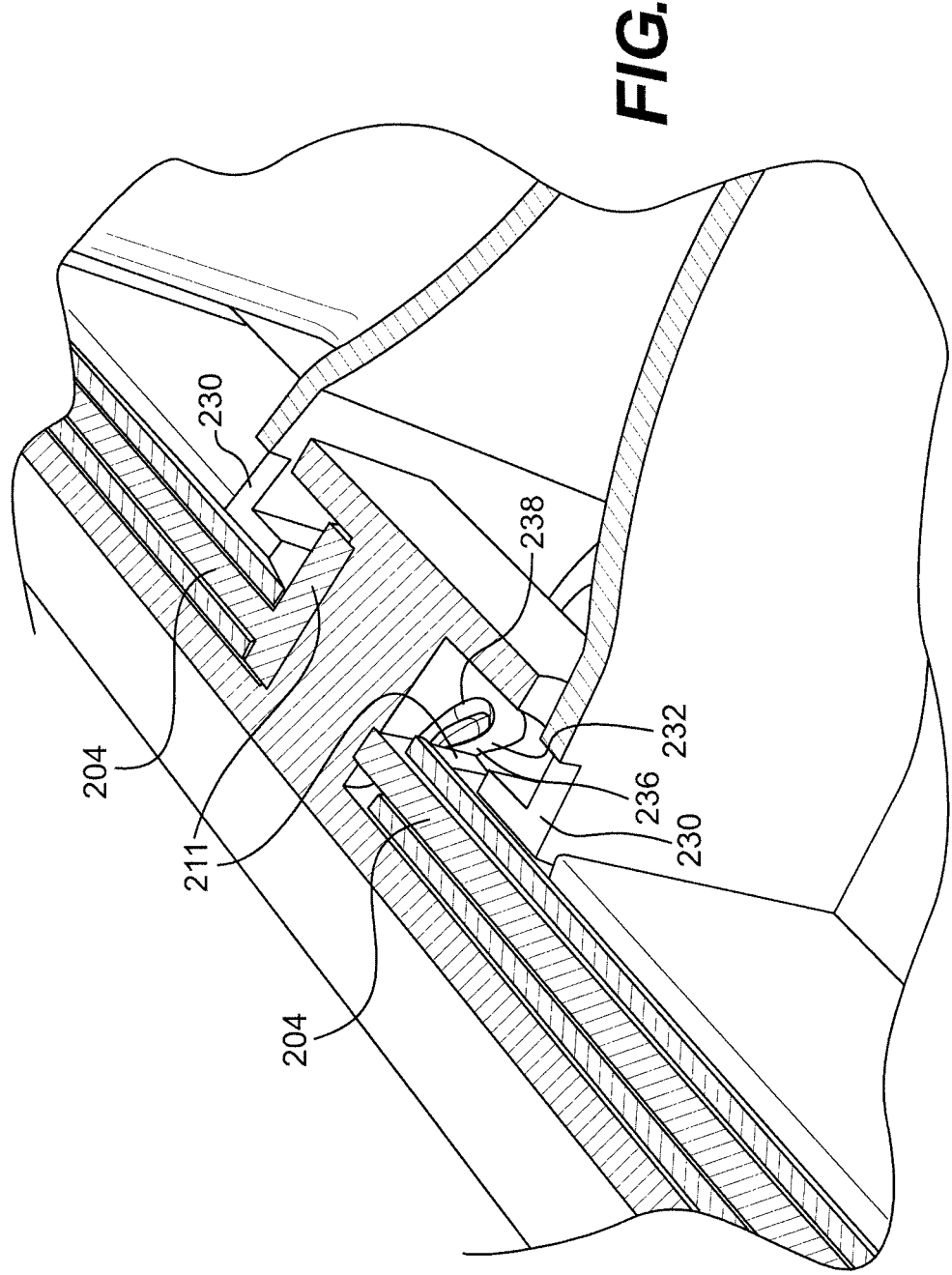
FIG. 5 is a view of a horizontal sectional view taken of the central divider looking down from above left which reveals the cam on that side.
Figure 6:
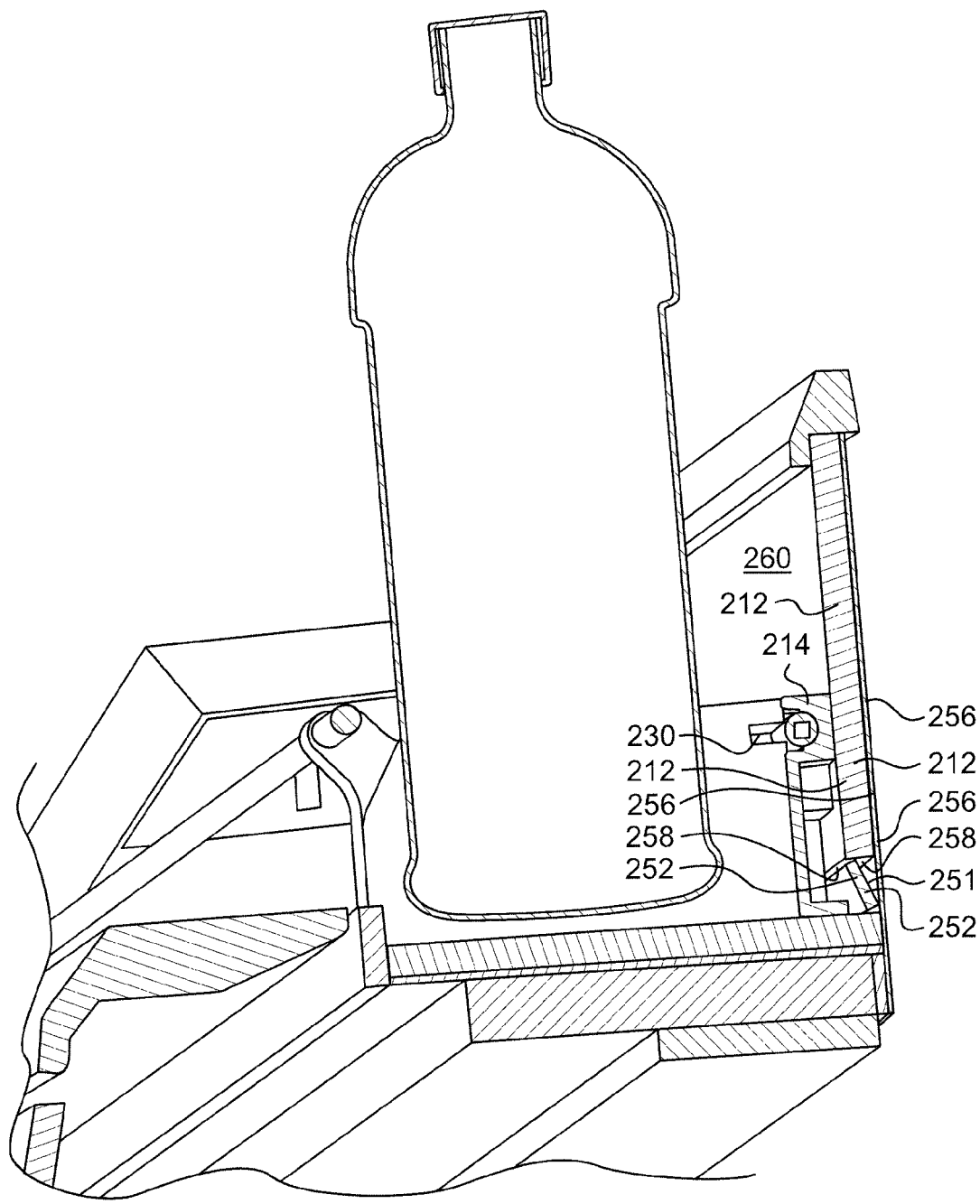
FIG. 6 is a sectional view taken at Section 6-6 shown in FIG. 1.
Figure 7:
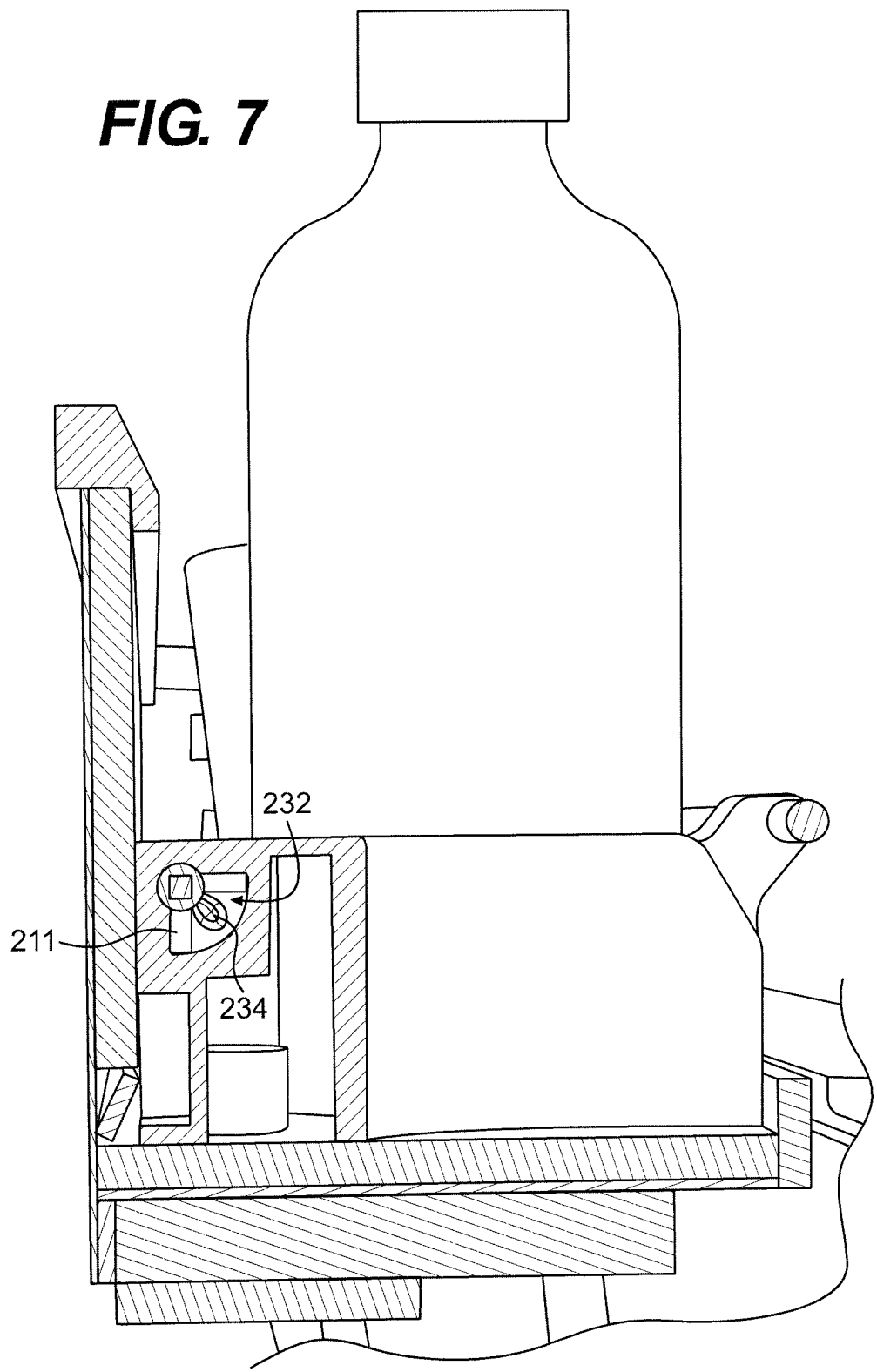
FIG. 7 is a sectional view taken at Section 7-7 shown in FIG. 1.
Figure 8:
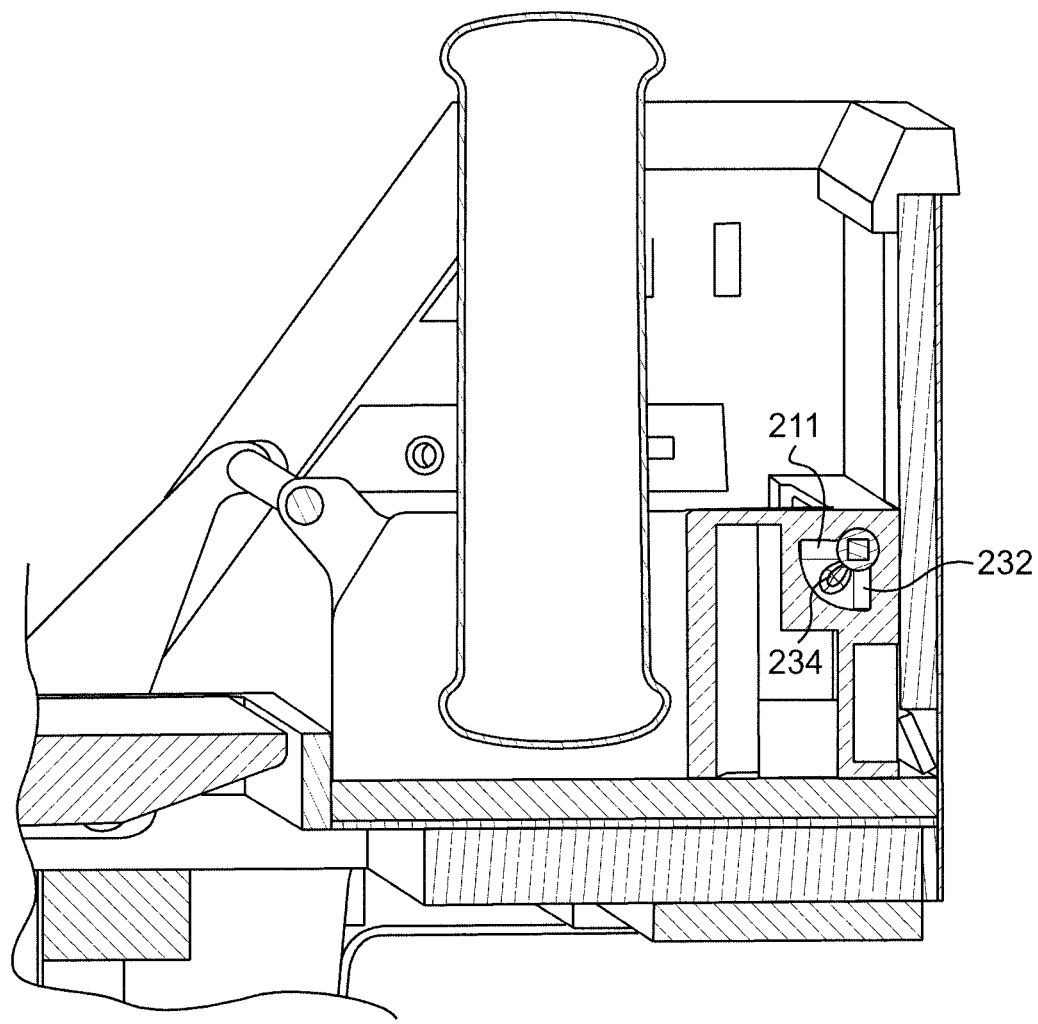
FIG. 8 is a sectional view taken at Section 8-8 shown in FIG. 1.
Figure 9:
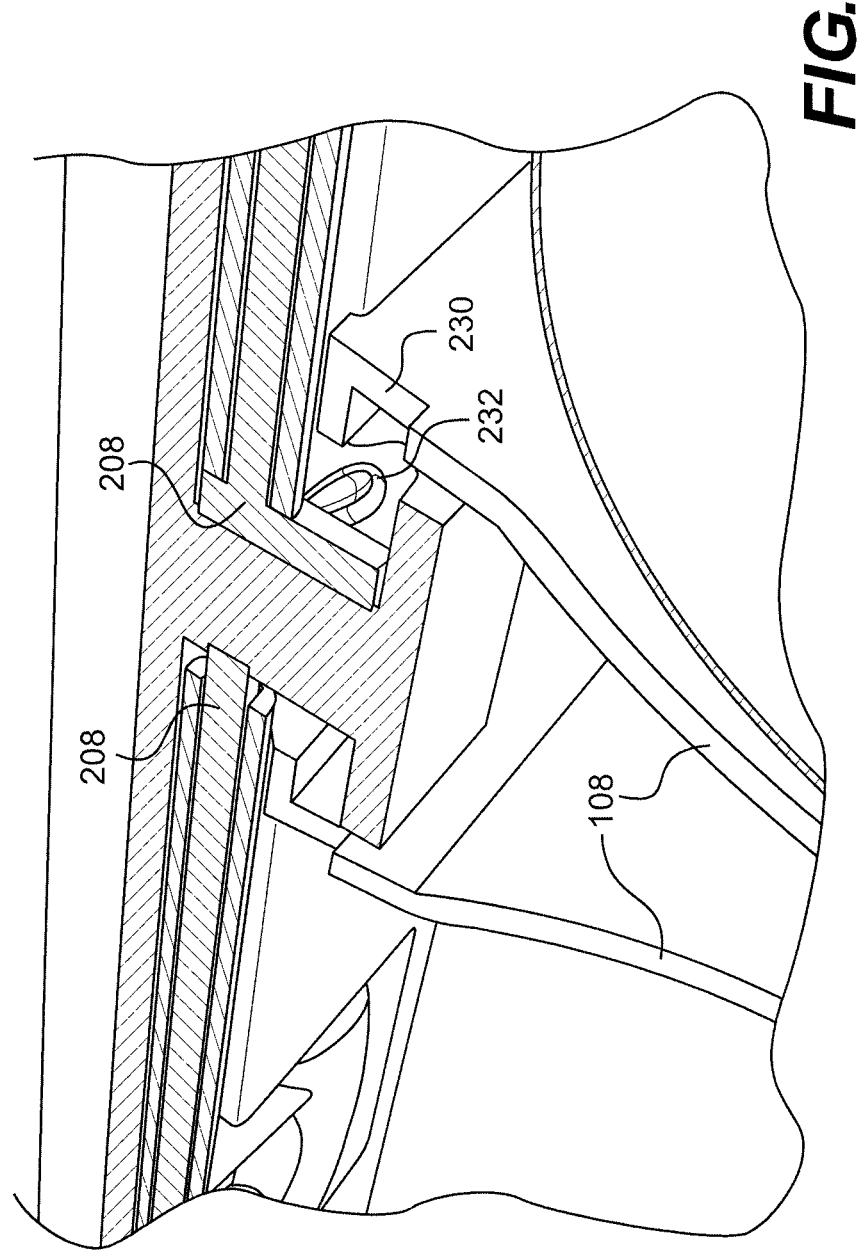
FIG. 9 is a horizontal section taken through the central divider looking down from above right which reveals the cam on that side.

Cup holder arrangement 200 also includes a back wall panel 212 as can be seen in FIG. 3. In one embodiment, back wall panel 212 is part of an illumination system. As can be seen in FIG. 3, the lower portion of the light guide/back wall 212 drops behind the footer 214. This leaves an emitting face 260 (see FIGS. 3 and 6) of the panel 212 that provides light to the article-receiving platform 120. The light is supplied by a plurality of LEDs which are located along a light-receiving edge 258 of the underside of the light guide/back wall panel 212. These LEDs, in the disclosed embodiment, are located on an backward and upwardly directed surface 251 of the PC board 252. The light guide is backed with a reflective paint or film 256. The LEDs on the surface 251 of the angled elongated board 252 direct the light emitted against the film 256 into the receiving face 258. Although not visible in FIG. 6, it should be understood that the LEDs on the PC board run the full length of the light guide 212 behind the footer 214. Then the light travels up through the light guide 212 to be emitted from the face 260 to illuminate the shelf area. Light from emitting face 260 enables persons to see any articles located on the open faced ledge 102.

At the interface between back wall 212 and platform 120 is an outcropped footer 214 which runs along the front ledge 102. An elongated channel 218 is molded into the footer 214 on each side of the central divider 108 so that each rod 204 can be received therein. Two receiving areas 216 are defined into outcropped footer 214 for the purpose of accepting the retaining heads 206 when the retaining heads 206 are retracted as shown on the left-hand side of central divider 108 in FIG. 1. Near each of the opposing angled sidewalls 104, a corridor 220 exists for the purpose of receiving the rod ends 210 of each bar/rod 204. In embodiments a spring 222 exists in the corridor 220 to provide the resiliency when the first rod end 208 is inserted into it so that each tang end 211 is compelled inward toward central divider 108.

Central divider 108 also participates in securing the bar 204. More specifically, a receiving/locking slot 230 on each side of the central divider 108 is used to accept the tang end of the bar. Central divider 108 also includes (internally) two outwardly facing cams 232 on each side. Each cam 232 includes a transition ridge 234 which is used to create two positions for the bar 204.

Each rod 204 can be installed and removed if desired. For example, referring to rod 204 for cup holder 202b (see right hand side of console 100), first end 208 is inserted into the corridor 220 so that it compresses spring 222 therein. Next, the other end is brought to where it mates with and is able to penetrate slot 230. The rod 204, because of the resiliency in spring 222, will remain inside the divider 108 against cam 232.

Now installed, the rod 204 will be in one of two positions. In first position (see, e.g., the position of cup holder 202a on the left hand side of the console) the retaining heads 206 are down and included in the receiving areas 216 so that they are substantially flush with the front face of the footer 214. While in this position, the protrusion 211 is pointing downward (like the heads 206). FIG. 2A shows the position of the protrusion relative to the transition ridge 234 when in the first position.

In order to move the cup holder to a second position (see, e.g., the position of cup holder 202b on the right hand side of console 100) the user simply lifts on one of the retaining heads 206, such that the retaining heads rotate up to face horizontally outward relative to the back wall 212. In other words, the cup holder is flipped up and out. See, e.g. FIG. 3. When the rotation begins, engagement of the protrusion 211 with an upwardly ramped surface 236 of the cam 232 offers ever increasing resistance, and would, absent continued force applied by the user, cause the protrusion 211 and thus, the dividers 206 to snap back into the first position. But once the protrusion 211 passes over the transition ridge 234, a downwardly ramped surface 238 is reached, and the protrusion 211 immediately snaps into the second position shown existing with cup holder 202b in FIG. 2B. So long as the rod 204 remains installed in a channel 239, the dividers 206 can be moved between each of the first retracted and second extended positions depending on which side of the transition ridge 234 the tang end 211 of bar 204 is rotated to. It is this spring 222 which holds the tag end 211 against the cam 232. And the bar 204, unless forcibly moved, will remain in one of the two positions, because the upwardly ramped surface 236, when acted on by the spring biased protrusion 211, will compel the bar to the first position whenever the protrusion is underneath the transition ridge 234, and the downwardly ramped surface 238 will compel the spring engaged protrusion 211 (and thus the cup holder assembly) into the second position whenever the protrusion is moved above the transition ridge.

If the user ever needs to remove either of cup holders 202a or 202b, this can be accomplished by simply gripping one of the dividers 206 and rotating the rod to the second position (where the protrusion matches up with slot 230), and then pushing the rod outward into corridor 220 to near maximum insertion. This will cause the protrusion 211 to come out of, and thus be released by, the slot 230 in center divider 108. Thus, the cup holder member 202 can be removed from the channel 239. This could be done for cleaning, repair, or other purposes.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:
1. A console. for an aircraft comprising:
an open faced ledge having a back wall, a platform, and a pair of opposing sidewalls;
the platform being adapted to support personal items;
a portion of the back wall being illuminated by a lighting system;
at least one of the sidewalls including an electronics-device connector;
elongated bars on each side of an outcropped central divider, each elongated bar having an extending tang on a first bar end, and a second rod end, each elongated bar also having two flip-out retaining heads, the retaining heads laterally securing containers received between said back wall and a front rail;
the tang on each first bar end being receivable and rotatably securable through a slot and into the central divider to bear against a cam surface reciprocating with each of tang on each first bar, the cam surfaces being located inside the central divider;
each cam having a transition ridge which, when reached by its reciprocating tang, compels the tang into a first radial position in which the retaining heads on that bar are in an extended position, or a second radial position where the retaining heads on that bar are in a retracted position;
each second bar end being receivable into a spring-loaded corridor located laterally outward from the central divider; and
a spring included in each spring-loaded corridor compelling the first end of each bar into the central divider against each respective cam surface.

2. The console of claim 1 wherein at least a portion of the back wall panel is a light guide, and a plurality of LEDs are located along a light-receiving edge of the light back wall panel.

3. The console of claim 2 Wherein the light guide is backed with a reflective surface.

4. The console of claim 3 wherein the LEDs emit against the reflective surface to indirectly supply light to the light guide.

5. The console of claim 1 wherein. the electronics-device connector is one or more of a USB port, an audio jack, and an electronics interface.

* * * * *